Sept. 22, 1964     D. R. JOHANNSEN     3,149,508
AUTOMATIC STAKING MACHINE

Filed Aug. 3, 1962     2 Sheets-Sheet 1

INVENTOR.
Donald R. Johannsen
BY
Dale A. Winnie
ATTORNEY

Sept. 22, 1964 D. R. JOHANNSEN 3,149,508
AUTOMATIC STAKING MACHINE
Filed Aug. 3, 1962 2 Sheets-Sheet 2

INVENTOR.
Donald R. Johannsen
BY
Dale A. Winnie
ATTORNEY

United States Patent Office 3,149,508
Patented Sept. 22, 1964

3,149,508
AUTOMATIC STAKING MACHINE
Donald R. Johannsen, 1510 S. River Park Drive,
Inkster, Mich.
Filed Aug. 3, 1962, Ser. No. 214,611
3 Claims. (Cl. 78—1)

This invention relates to machine tools generally and more particularly to high production machine tool devices including specifically those for staking operations.

There is an ever increasing demand for machine tools which will keep pace with high production requirements and are still relatively inexpensive and easy to maintain. It is most desirable that such machine tools also be adaptable for multiple uses and not be limited to one specific job since changes in production requirements and product designs may otherwise make the equipment obsolete before its time.

High production machine tools are most generally of special design and include precision castings and fixtures with extensive electrical and electronic circuity interrelated with operative parts thereof. This equipment is usable only by large manufactures having sufficient volume to be able to make continuous use thereof and is totally impractical for the smaller manufacturers who need the equipment for short run work.

It is an object of this invention to provide a high production machine tool device which is simple in construction and accordingly relatively inexpensive to manufacture and sell.

It is an object of this invention to provide an automated machine tool including no electrical or electronic circuity and yet including the advantages of such expensive equipment in having interconnected work stations.

It is an object of this invention to provide a machine tool device particularly suited for punching or staking operations and capable of meeting high production demands.

It is an object of this invention to provide a machine tool device wherein a single work tool is required instead of multiple tools which invariably increase the cost of such equipment.

It is an object of this invention to provide a piece of equipment which is adaptable for use with different work pieces by simple adjustment and without extensive revision or replacement of different machine tool components.

It is an object of this invention to provide a machine tool device including a simple work piece carrier and having an oscillating tool head disposed in working relation to the work pieces carried thereby and signaled for working engagement therewith automatically as the work passes through the work station of the machine.

Numerous other objects and advantages to be gained in the practice of this invention will be more apparent after a reading of the following specification covering a machine tool device for staking operation and which embodies the basic principles of this invention.

Figure 1:
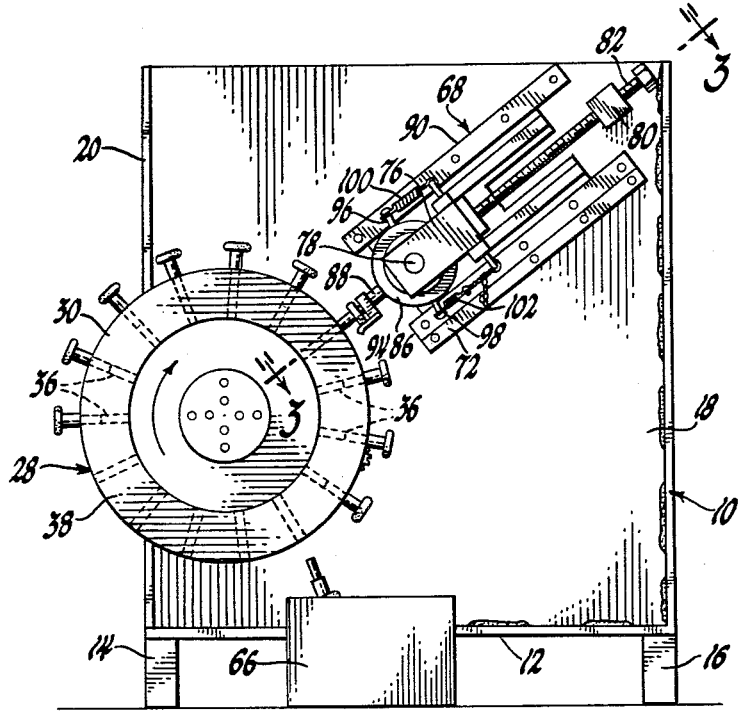
FIGURE 1 is a side plan view of a machine tool for staking the ends of axle shaft members to retain a small wheel on the end thereof.
Figure 2:
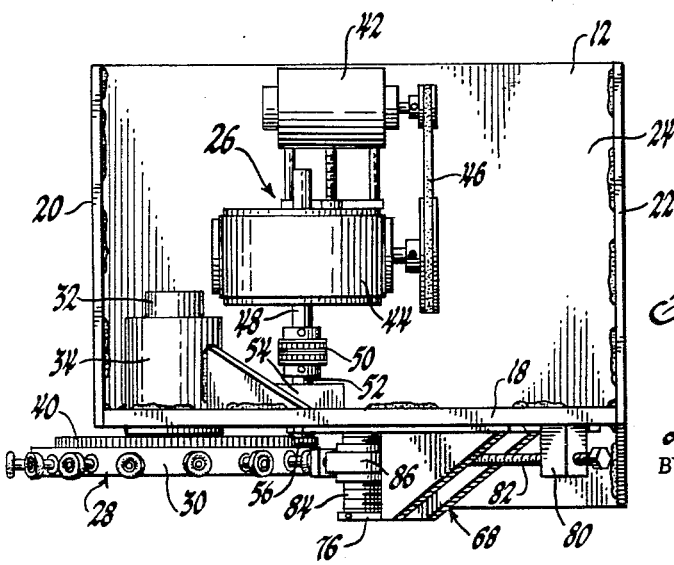
FIGURE 2 is a top plan view of the machine tool device shown by FIGURE 1.
Figure 3:
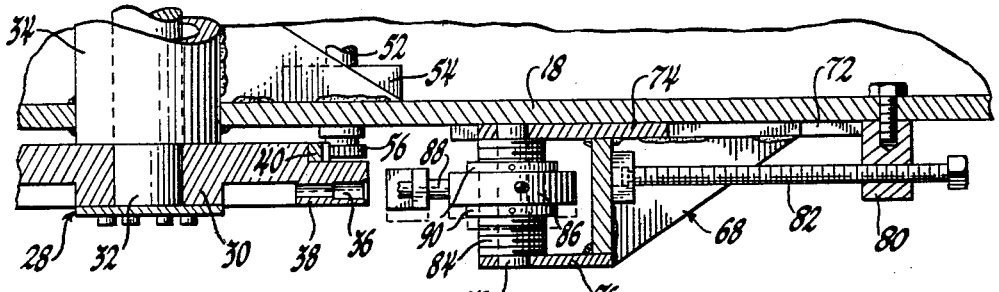
FIGURE 3 is an enlarged cross-sectional view of the machine tool device shown by FIGURES 1 and 2 as seen in the plane of line 3—3 of FIGURE 1, looking in the direction of the arrows thereon.

The particular machine tool apparatus shown by the drawings, and hereinafter described, is for staking the ends of shaft members to hold a small wheel on the end thereof.

The machine tool stand 10 includes a base 12 with supports 14 and 16 provided thereunder.

A metal plate member 18 is mounted on the base 12 and stands vertically thereover near the front edge of the base. Sidewalls 20 and 22 are welded to the base 12 and vertical plate 18 and extend rearwardly of the latter. They serve to support the vertical wall member 18 and to provide a protective area 24 for the drive mechanism 26 which will be described later.

A turntable member 28 is mounted on the wall 18 for rotation about a horizontal axis. It includes a circular or wheel shaped part 30 secured to a shaft 32 which is supported in a journal bearing assembly 34 provided on the back side of the vertical wall 18 and accessible therethrough.

The turntable member 28 serves as a rotatable work piece carrier and is provided with a plurality of radially disposed bores 36 within the periphery of its rim 38 for just such purpose. Although other work piece receptive means might be provided on the turntable, in the present instance the work pieces include small shafts which fit into the bores 36 and make this arrangement most practical.

A ring gear 40 is provided within a recess or shoulder area on the back side of the turntable 28 and near the outer periphery thereof. The ring gear is used for drive purposes as will be described.

A drive motor 42 and gear box 44 are mounted on the base 12 behind the vertical wall 18 and within the protected area 24 mentioned previously. A belt and pulley arrangement 46 connects the drive motor and gear box and provides the drive for the output shaft 48 from the gear box 44. The output shaft 48 is in turn connected by a coupling 50 to a shaft 52 journalled within suitable bearing means 54 provided in the support wall 18. A pinion gear 56 is provided on the end of the shaft 52 which extends through the wall and it is disposed for driving engagement with the ring gear 40 on the turntable member 28.

Figure 4:
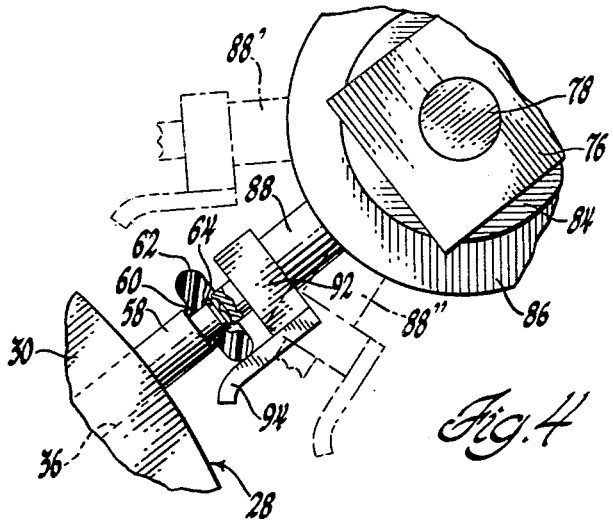
FIGURE 4 is an enlarged and fragmentary view of the work station operation of the apparatus under discussion.
Figure 5:
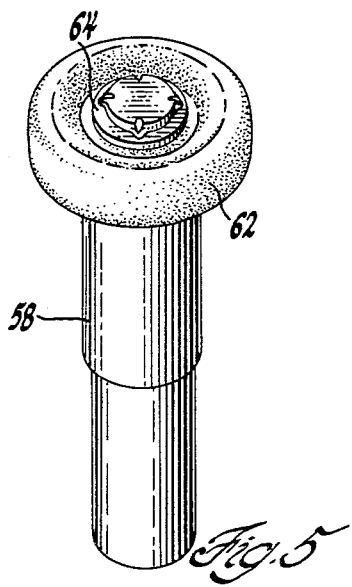
FIGURE 5 is an enlarged and perspective view of the work piece member showing the work performed thereon.

Referring to FIGURES 4 and 5, it will be noted that the particular work pieces being processed include a shouldered shaft 58 which fits into the bores 36 provided within the peripheral edge of the turntable member 28. The exposed end of the shaft part 58 is intended to receive a washer 60, small rubber wheel part 62 and another washer 64 thereon. Subsequently the end of the shaft is staked to retain such parts assembled therewith.

FIGURE 1 shows that the shaft parts 58 are pre-assembled with their washers and wheel parts and are positioned within the shaft receptive bores 36 during the top half of the carrier cycle. It will be noted and appreciated that the assembled work pieces automatically fall out of the receptive bores 36 as the carrier reaches its lower arc.

A box or like means 66 may be provided to catch the assembled work pieces as they are ejected by gravity from the carrier.

The staking operation is accomplished while the turntable 28 is in motion and without interrupting its cycle. This is done by a staking tool mounted on a carrier 68 provided on the vertical wall support 18 and oriented relative to the turntable.

Tool carrier 68 is disposed in radial alignment with the turntable 28 and is supported for adjustment relative thereto by guide member 70 and 72 secured to the support wall 18. The carrier includes a base 74 which slides on the wall 18. A trunnion support 76 is provided on the base part of the carrier and is adapted to receive a stub shaft 78 in journal support therein.

The carrier is adjustable relative to the turntable by means of a fixed block 80 secured to the support wall 18 and an elongated screw 82 threaded therethrough and engaged to the carrier.

The axis of the shaft 78 of the carrier extends transversely of the support wall 18 and is parallel to the axis of the turntable member 28. It has a threaded sleeve 84 provided thereon and a tool head or holder 86 which is adjustable on the sleeve.

The tool holder 86 is intended to receive a tool member 88 therein and, by proper adjustment, to align the tool relative to work pieces transported by the turntable or carrier 28. Following axially positioning of the holder it is held in place by lock nuts 90 which are threaded on the sleeve member 84.

The staking tool 88 extends radially outward from the tool holder and includes a collar 92 with an index finger 94 provided thereon. The index finger 94 extends beyond the end of the staking tool and is disposed for engagement by each work piece as it passes in close proximity thereto.

The tool holder 88 includes ears or pegs 96 and 98 on diametrically opposite sides thereof which are engaged by tensioning springs 100 and 102 provided on the carrier 68. These springs are adjustable for balanced tensioning of the tool head or holder 88 to a position where the index finger 94 will be engaged by a work piece and it will, in turn, rotate the tool to a staking position. Further movement of the work piece carries the tool through an arc until the index finger is released and the tool head can return.

The relative positions of the tool member 88, rotating with the holder 86, is best shown by FIGURE 4. The dotted line position 88' is the biased position for work feed, the full line view shows the staking position of the work and tool, and the dotted line position 88" shows the release position of the tool part.

From the description it will be appreciated that the tool holder or head 86 is made to oscillate and to have the staking tool 88 travel in an arc that is tangent to the travel of the work piece carried by the turntable. The index finger 94 serves as an operative means for assuring coincidence of the work and tool at the point of tangency. Thus, by radial adjustment of the tool carrier 68 relative to the turntable, the tool member 88 can be set to crimp or stake the ends of the work piece shaft as the work and tool pass through the point of tangency.

Each work piece, in its own course of travel, will engage and initiate the tool movement necessary to effect the required work thereon. As the work passes through the work station it moves relatively away from the tool, as the carrier and tool arcs separate, until the index finger is released. The tool head is then biased to return the tool back through the point of tangency and in position for the next pickup of a work piece by the index finger.

Figure 6:
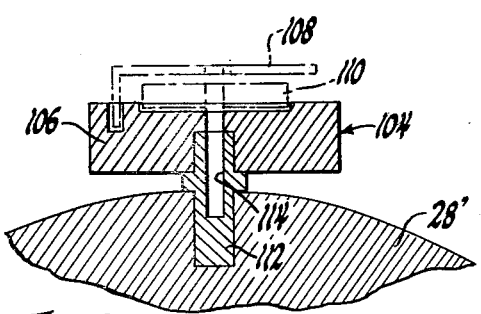
FIGURE 6 is an enlarged and fragmentary view of the work carrying wheel showing a work piece adapting fixture used therewith.

FIGURE 6 shows a work piece adapter 104 which may be used with a carrier wheel 28' to hold and position component parts prior to the machine work to be performed thereon. The adapter 104 includes a body part 106 that serves as the fixture to hold and dispose parts such as 108 and 110, shown in phantom outline, relatively aligned. It includes a threaded shank 112 or the like for retention in the bore 36' which is provided in the periphery of the carrier wheel. It may also have the shank member 112 include a bore 114 for a pin or shaft (not shown) whose end is to be staked as in the manner previously described.

It will be appreciated that the adapter 104 also serves as a means of increasing the radius of the work carrier and, accordingly, of locating the actual part on which work is to be performed relative to the work tool 88 without relocation of the work tool carrier 68 itself.

In the illustrated embodiment of this invention, the rotational speed permissive for the carrier 28 is limited to the time necessary to pre-assemble and position work pieces on the turntable carrier. However, it will be appreciated that other means of work piece feed may be employed to speed this step and that the only limit of consequence is in the return of the tool back through the work station each time.

It will be noted that the peripheral drive through the gear pinion 56, immediately adjacent and behind the work pieces, avoids any torsional stress in the work carrier 28. Furthermore, the drive is removed from the support axis of the carrier, allowing better journal support, and is disposed relatively between the carrier and staking tool and in a position where it is not subjected to the resistant forces incident to the staking operation.

Although a preferred and practical embodiment of this invention has been shown and described, it will be appreciated that certain modifications and improvements are within the scope of the invention set forth. Such of these modifications and improvements as are not specifically excluded by the language of the hereinafter appended claims are to be considered as intentionally included within the scope of such claims.

I claim:

1. A machine tool device, comprising: a stand including a vertical support and having a turntable provided on said support and disposed for rotation about a horizontal axis, means provided on said turntable for receiving work pieces and disposing a work surface thereof for travel concentric therewith, a tool carrier mounted on said support and radially adjustable relative to said turntable, said tool carrier having a tool holder mounted thereon for oscillation about an axis parallel to that of said turntable, a work tool mounted in said tool holder for oscillation therewith and passage through the point of tangency relative to the travel of said work piece surfaces, drive means operative of said turntable, and indexing means provided on said tool holder and operative thereof and of said tool through said point of tangency coincident with the passage of work pieces therethrough.

2. The machine tool device of claim 1: said indexing means including a depending finger on said tool disposed for pickup engagement with successive work pieces, and means biasing said holder in a work receptive direction for finger engagement with said work pieces and the return thereof upon disengagement therewith.

3. A machine tool device, comprising: a stand including a vertical support and having a turntable provided on said support for rotation about a horizontal axis, means provided within the outer periphery of said turntable for receiving and supporting work pieces with the work surface thereof disposed for concentric travel therewith, drive means peripherally engaging said turntable for rotation thereof, a tool carrier mounted on said vertical support and having a tool holder provided thereon and supported for oscillation about an axis parallel to the rotational axis of said turntable, a work tool carried by and extended radially beyond said tool holder for oscillation in an arc having a point of tangency with the travel of said work piece surfaces, means for radially adjusting said tool carrier relative to said turntable for tangential alignment of said tool relative to the travel of said work pieces, an index finger provided on said tool and extended beyond the end thereof for work piece engagement, and means biasing said tool holder to dispose said index finger for pickup engagement with successive work pieces passing thereunder and activation of said work tool into working coincidence with each successive work piece at said point of tangency in the course of travel therethrough.

References Cited in the file of this patent

UNITED STATES PATENTS

| | | |
|---|---|---|
| 2,028,225 | Larson | Jan. 21, 1939 |
| 2,185,351 | Myers | Jan. 2, 1940 |
| 2,298,077 | Witter | Oct. 6, 1942 |
| 2,890,468 | Arnold | June 16, 1959 |
| 2,901,968 | Gottscho | Sept. 1, 1959 |
| 2,915,963 | Carkhuff | Dec. 8, 1959 |